(12) United States Patent
Zhou (10) Patent No.: US 10,701,870 B2
(45) Date of Patent: Jul. 7, 2020

(54) MULTIFUNCTIONAL HANGING-TYPE PLANT-GROWING ASSEMBLY

(71) Applicant: Ningbo Yilin Aguatech Co., Ltd., Ningbo, Zhejiang (CN)

(72) Inventor: Chunfu Zhou, Zhejiang (CN)

(73) Assignee: Ningbo Yilin Aguatech Co., Ltd. (CN)

( * ) Notice: Subject to any disclaimer, the term of this patent is extended or adjusted under 35 U.S.C. 154(b) by 358 days.

(21) Appl. No.: 15/789,769

(22) Filed: Oct. 20, 2017

(65) Prior Publication Data

US 2018/0110188 A1   Apr. 26, 2018

(30) Foreign Application Priority Data

Oct. 21, 2016   (CN) .......................... 2016 1 0919729

(51) Int. Cl.
*A01G 9/02*   (2018.01)
*A01G 7/04*   (2006.01)
*A01G 27/00*   (2006.01)

(52) U.S. Cl.
CPC ............ *A01G 9/024* (2013.01); *A01G 7/045* (2013.01); *A01G 9/023* (2013.01); *A01G 9/025* (2013.01); *A01G 27/003* (2013.01); *A01G 27/005* (2013.01)

(58) Field of Classification Search
CPC . A01G 7/045; A01G 9/00; A01G 9/02; A01G 9/022; A01G 9/025; A01G 27/003; A01G 27/005; A01G 27/02; A01G 27/06; A47G 7/00
USPC ............................................. 47/39, 66.6, 67
See application file for complete search history.

(56) References Cited

U.S. PATENT DOCUMENTS

| | | | | |
|---|---|---|---|---|
| 5,251,399 A | * | 10/1993 | Rasmussen ............ | A01G 9/023 211/88.03 |
| 5,367,823 A | * | 11/1994 | Ferris .................... | A47F 7/0078 47/39 |
| 7,788,848 B1 | * | 9/2010 | Koumoudis ........... | A01G 9/025 47/65.9 |
| 8,516,743 B1 | * | 8/2013 | Giacomantonio ..... | A01G 31/02 47/62 A |
| 8,578,651 B1 | * | 11/2013 | Giacomantonio ..... | A01G 31/02 47/59 R |
| 9,131,646 B2 | * | 9/2015 | Sung ...................... | A01G 9/025 |
| 9,986,694 B2 | * | 6/2018 | Billingsley ............ | A01G 9/023 |
| 10,383,287 B2 | * | 8/2019 | Kingelin ................. | A01G 7/04 |
| 10,555,464 B1 | * | 2/2020 | Leeworthy ............. | A01G 27/04 |

(Continued)

FOREIGN PATENT DOCUMENTS

| | | | | |
|---|---|---|---|---|
| FR | 2788931 A1 | * | 8/2000 | ............. A01G 9/022 |
| JP | 3187481 U | * | 11/2013 | ............. A01G 9/022 |

*Primary Examiner* — David J Parsley
*Assistant Examiner* — Danielle A Clerkley (57) ABSTRACT

A multifunctional hanging-type plant-growing assembly, comprising a supporting system, a planting system and a watering system; the supporting system comprises a bottom frame, at least two stand columns that are fixed on the bottom frame and extend upwards, and hanging hooks disposed on the stand columns; the planting system comprises at least one planting basket and at least one flowerpot placed in the planting basket; the watering system comprises a water storage tank, a water pump matched with the water storage tank, and a water pipe with one end connected to the water outlet of the water pump; the water pump is connected to the power supply through a control switch.

11 Claims, 8 Drawing Sheets

(56) References Cited

U.S. PATENT DOCUMENTS

| | | | | |
|---|---|---|---|---|
| 2003/0089037 A1* | 5/2003 | Ware | A01G 31/02 | 47/83 |
| 2009/0223126 A1* | 9/2009 | Garner | E04F 13/081 | 47/66.7 |
| 2010/0146855 A1* | 6/2010 | Ma | A01G 9/025 | 47/82 |
| 2011/0059518 A1* | 3/2011 | Bribach | A01G 9/025 | 435/266 |
| 2011/0107667 A1* | 5/2011 | Laurence | A01G 9/025 | 47/59 S |
| 2012/0167460 A1* | 7/2012 | Omidi | A01G 9/023 | 47/65.7 |
| 2012/0227320 A1* | 9/2012 | Dos Santos | A01G 9/025 | 47/79 |
| 2012/0285084 A1* | 11/2012 | Hu | A01G 9/022 | 47/39 |
| 2013/0025196 A1* | 1/2013 | Decker | A47G 7/044 | 47/39 |
| 2013/0118070 A1* | 5/2013 | Marquez | A01G 9/02 | 47/66.6 |
| 2013/0118074 A1* | 5/2013 | Fulbrook | A01G 9/025 | 47/62 N |
| 2013/0152467 A1* | 6/2013 | Chang | A01G 9/025 | 47/82 |
| 2013/0180172 A1* | 7/2013 | Silverberg | A01G 9/022 | 47/65 |
| 2014/0075840 A1* | 3/2014 | Gosling | A01G 9/025 | 47/81 |
| 2014/0115963 A1* | 5/2014 | Sung | A01G 9/025 | 47/82 |
| 2014/0318011 A1* | 10/2014 | Jarvinen | A01G 9/025 | 47/79 |
| 2015/0237811 A1* | 8/2015 | Marquez | A01G 9/023 | 47/66.6 |
| 2015/0289452 A1* | 10/2015 | Axley | F28C 3/06 | 47/66.6 |
| 2016/0037733 A1* | 2/2016 | Baker | A01G 9/025 | 47/82 |
| 2016/0066525 A1* | 3/2016 | Duquesnay | A01G 9/025 | 47/62 R |
| 2016/0192604 A1* | 7/2016 | Prescott | A01G 9/025 | |
| 2016/0366836 A1* | 12/2016 | Wu | A01G 9/023 | |
| 2018/0054987 A1* | 3/2018 | Berman | A01G 7/045 | |

* cited by examiner

MULTIFUNCTIONAL HANGING-TYPE PLANT-GROWING ASSEMBLY

TECHNICAL FIELD OF THE INVENTION

The present invention relates to the technical field of plant-growing equipment, and more particularly, to a multifunctional hanging-type plant-growing assembly.

BACKGROUND OF THE INVENTION

As the idea of "protecting the global environment" deepens, people have been increasingly concerned about air and food in the living environment. As a result, more and more air-purifying devices and green foods have emerged in the market. People living in big cities are longing for an idyllic, green and healthy life. The process of personally growing flowers, plants and vegetables can be a great happiness, which is helpful for alleviating the pressure from work and life. However, owning a piece of land for planting is a difficult thing due to the limited urban space.

The traditional indoor greening mainly comprises plane planting and corner planting. The plants that are grown by automatic watering devices must be divided by stages. Most of the watering devices can merely be used in a growing stage of young plants. In this stage, the root system of a young plant is capable of actively absorbing water from the soil. However, it's impossible for a plant in a seed stage to directly absorb water from the bottom of the flowerpot. A seed can merely absorb water after the soil around is wetted.

Another method for watering the plants in the prior art is to store a certain amount of water in the flowerpot, thereby allowing the water to be sucked to the bottom of the flowerpot through the soil and the water-absorbing belt. Such a method has obvious disadvantages: first, the soil at the bottom can be easily rotted; second, after being planted, the seeds cannot obtain sufficient water to germinate as the soil in the flowerpot is not completely wetted; third, the assembling process is very complicated.

SUMMARY OF THE INVENTION

The purpose of the present invention is to solve the shortcomings in the prior art by providing a multifunctional hanging-type plant-growing assembly, which enables the plants to grow more easily, and can be conveniently used and assembled by users.

To achieve the above purpose, the present invention adopts the following technical solution:

A multifunctional hanging-type plant-growing assembly comprising a supporting system, a planting system and a watering system; the supporting system comprises a bottom frame, at least two stand columns that are fixed on the bottom frame and extend upwards, and hanging hooks disposed on the stand columns; the planting system comprises at least one planting basket and at least one flowerpot placed in the planting basket; the watering system comprises a water storage tank, a water pump matched with the water storage tank, and a water pipe with one end connected to the water outlet of the water pump; the water pump is connected to the power supply through a control switch; a hook body matched with the hanging hook is disposed on the planting basket; the water outlet of the water pipe is matched with the flowerpot.

In another aspect of the present invention, a flowing water groove is disposed at the upper portion of the planting basket, and a flowing water maze is disposed on the flowing water groove. A water-guiding groove matched with the flowerpot is provided on the side surface of the flowing water groove. The water outlet of the water pipe is matched with the flowing water maze. The water-guiding groove is provided with a sponge block, and a water leakage hole is provided at the edge of the flowing water groove.

In another aspect of the present invention, inserting blocks are disposed at the bottom of the flowing water groove, and the upper portion of the planting basket is provided with inserting grooves that correspond to the inserting blocks.

In another aspect of the present invention, the water pipe is connected to a joint pipeline.

In another aspect of the present invention, the water pipe comprises a plurality of single-section pipelines, and the adjacent single-section pipelines are connected through a connecting mechanism.

In another aspect of the present invention, the connecting mechanism comprises a three-way pipe, a connecting head and a rubber water-stopping ring. The end portion of the joint pipeline is connected to the single-section pipeline through the three-way pipe. The connecting head is inserted into the top end of the three-way pipe in a vertical direction, and the rubber water-stopping ring is sleeved on one side of the connecting head.

In another aspect of the present invention, the hook body is disposed on the rear side surface of the planting basket, and the hanging hook is a U-shaped structure having an inward opening.

In another aspect of the present invention, the bottom frame comprises a front frame body. A drawing frame is disposed at the rear portion of the front frame body. The lower end of the stand column is fixed to the rear portion of the front frame body.

In another aspect of the present invention, the flowerpot is a quadrate-tapered structure, and the lower end of the flowerpot is smaller than the upper end of the flowerpot. A supporting leg is hinged to the lower portion of the rear side surface of the flowerpot.

In another aspect of the present invention, a sliding plate, which can be inserted in the flowerpot, is disposed in the planting basket. A partition plate is disposed between every two adjacent flowerpots. A vertical slide way, which allows the partition plate to be inserted, is provided in the planting basket.

In another aspect of the present invention, a lamp box, which is fixed at the upper end of the stand column, is connected to the power supply through an illumination control knob.

In another aspect of the present invention, a plurality of universal wheels is disposed at the bottom of the bottom frame.

Compared with the prior art, the present invention has the following advantages:

First, the plant-growing assembly of the present invention enables the plants to grow more easily. During use, the watering time and the interval time can be set by users. The plants can be automatically watered, or watered after setting the type of the light ray and the illuminating time on the water tank according to the plant type and the environment. Thus, the seeds can germinate more easily, and the plant root can be protected from being rotted even if the plant has been planted for a long time;

Second, the present invention can be used flexibly and conveniently. It's unnecessary to equip independent water-storing device and watering device. The present invention can be freely combined into a flower box group that can be placed anywhere indoors. The hanging-type structure of the present invention is space-saving, which enables the present invention to be conveniently placed on the balcony, hung on the wall or used as a decorative partition wall;

Third, the present invention can be easily assembled. Through the cooperation between the rubber water-stopping rings, a good water-stopping effect can be achieved. Meanwhile, various components are assembled in a plug-in manner, which allows the present invention to be easily installed and disassembled.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

11、Bottom Frame, 111、Front Frame Body, 112、Drawing Frame, 12、Stand Column, 13、Hanging Hook; 21、Planting Basket, 21a、Sliding Plate, 21b、Partition Plate, 21c、Vertical Slide Way, 21d、Inserting Groove, 211、Hook Body, 212、Flowing Water Groove, 212a、Inserting Block, 213、Flowing Water Maze, 214、Water-guiding Groove, 215、Sponge Block, 216、Water Leakage Hole, 22、Flowerpot, 221、Supporting Leg; 31、Water Storage Tank, 32、Water Pump, 321、Control Switch, 33、Water Pipe, 33a、Single-section Pipeline, 33b、Connecting Mechanism, 33b1、Three-way Pipe, 33b2、Connecting Head, 33b3、Rubber Water-stopping Ring, 331、Joint Pipeline; 40、Lamp Box, 41、Illumination Control Knob

DETAILED DESCRIPTION OF THE INVENTION

Drawings and detailed embodiments are combined hereinafter to elaborate the technical principles of the present invention.

Figure 1:
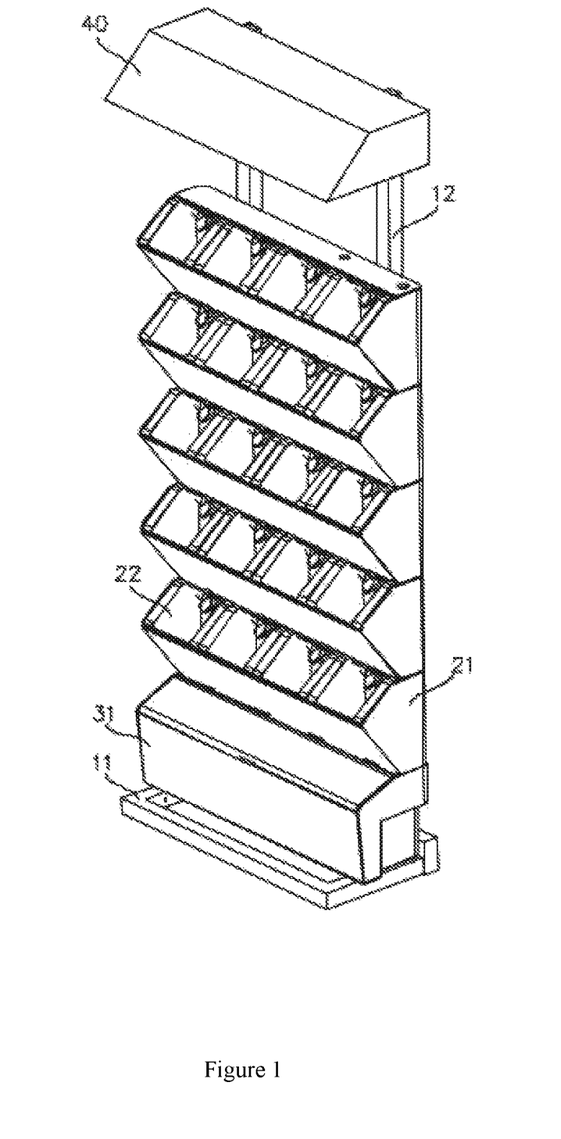
FIG. 1 is a three-dimensional diagram of the multifunctional hanging-type plant-growing assembly of the present invention when the plants are planted on one side.
Figure 2:
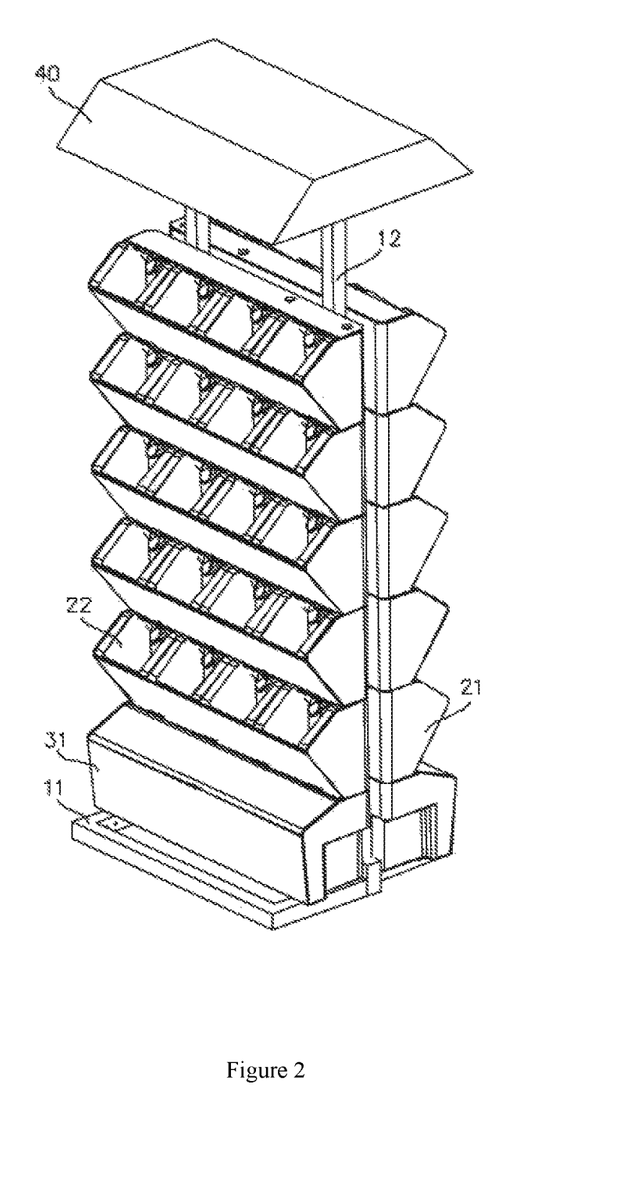
FIG. 2 is a three-dimensional diagram of the multifunctional hanging-type plant-growing assembly of the present invention when the plants are planted on two sides.

As shown in FIGS. 1 and 2, the multifunctional hanging-type plant-growing assembly of the present invention comprises a supporting system, a planting system and a watering system.

Figure 8:
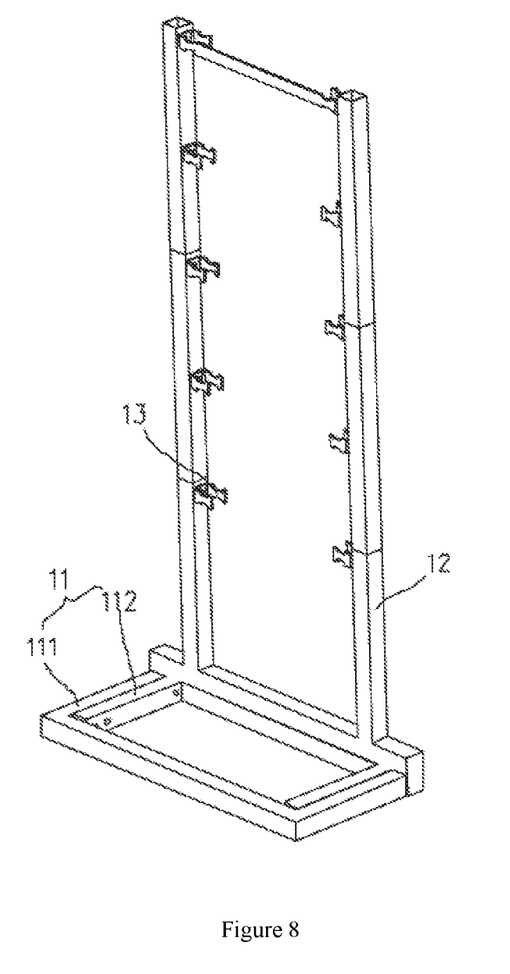
FIG. 8 and FIG. 9 are three-dimensional diagrams illustrating two different states of the supporting system of the present invention.
Figure 9:
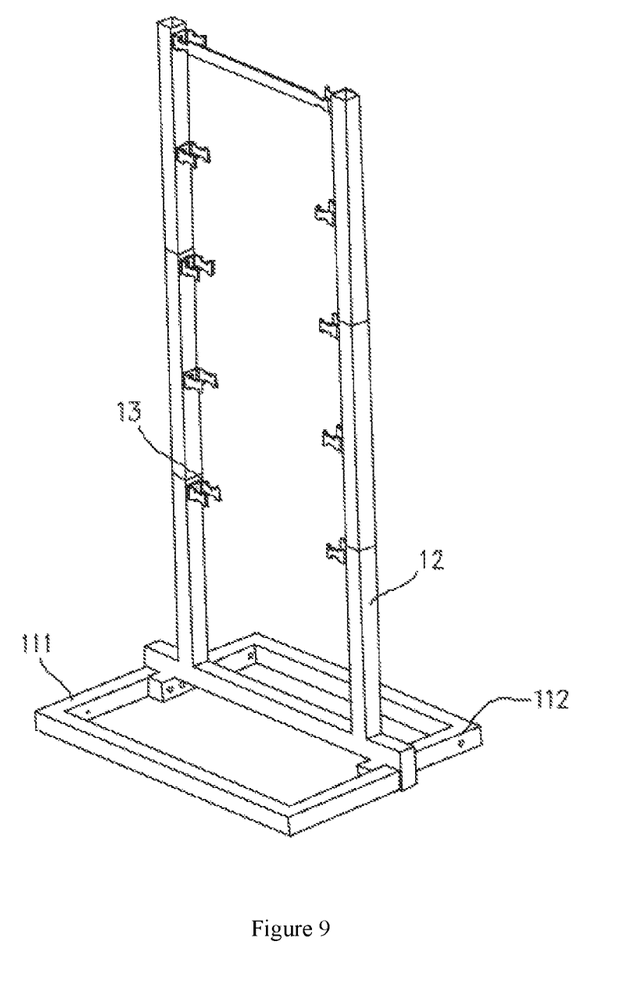

Specifically, as shown in FIGS. 8 and 9, the supporting system comprises a bottom frame 11, at least two stand columns 12 that are fixed on the bottom frame 11 and extend upwards, and hanging hooks 13 disposed on the stand columns 12. In this embodiment, there are two stand columns 12. The hanging hooks 13 are disposed on the inner side surfaces of the stand columns 12, wherein the inner side surfaces refer to the two opposite side surfaces of the two stand columns 12.

Figure 3:
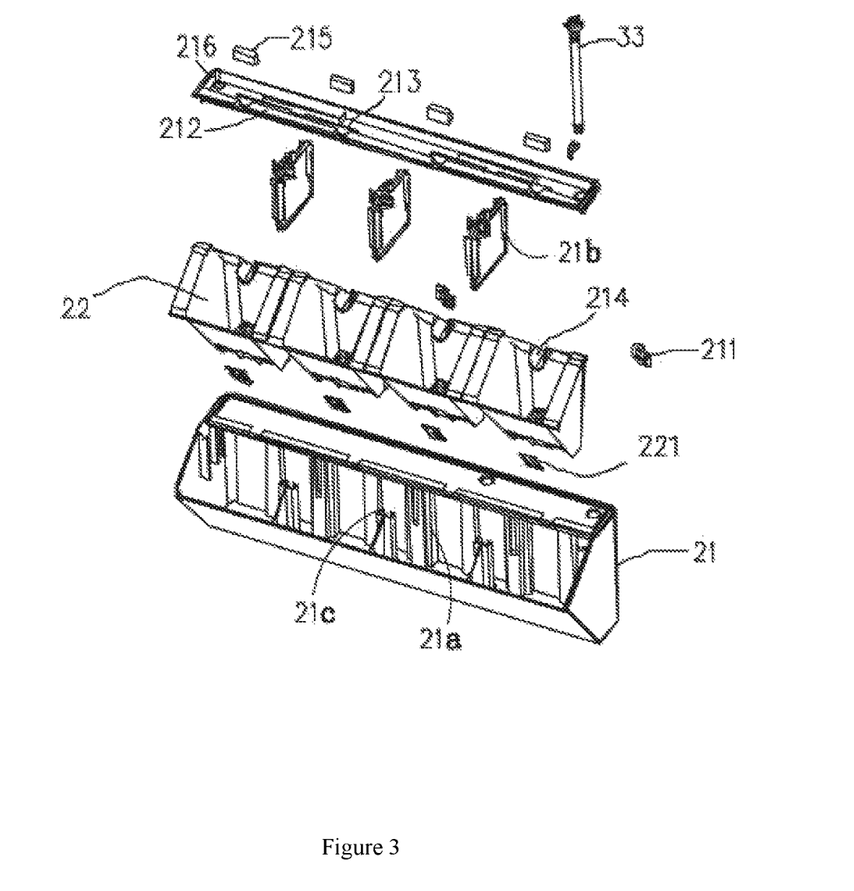
FIG. 3 is an exploded view of the planting system of the present invention.

As shown in FIG. 3, the planting system comprises at least one planting basket 21 and at least one flowerpot 22 placed in the planting basket 21.

Figure 5:
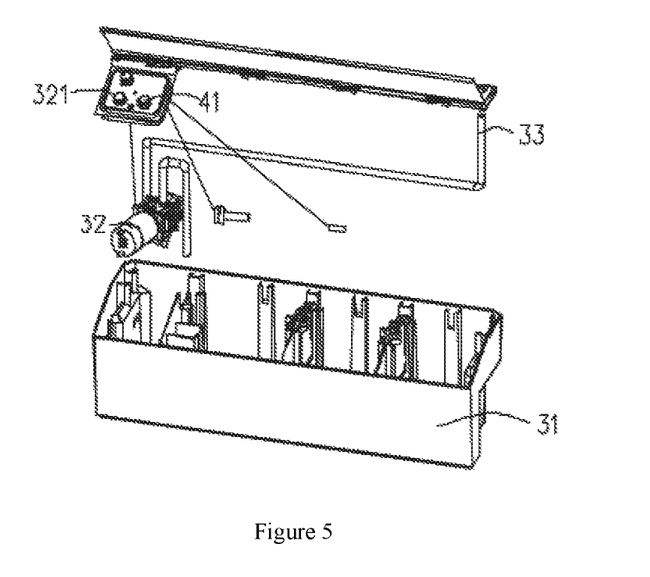
FIG. 5 is an exploded view of the watering system of the present invention.
Figure 6:
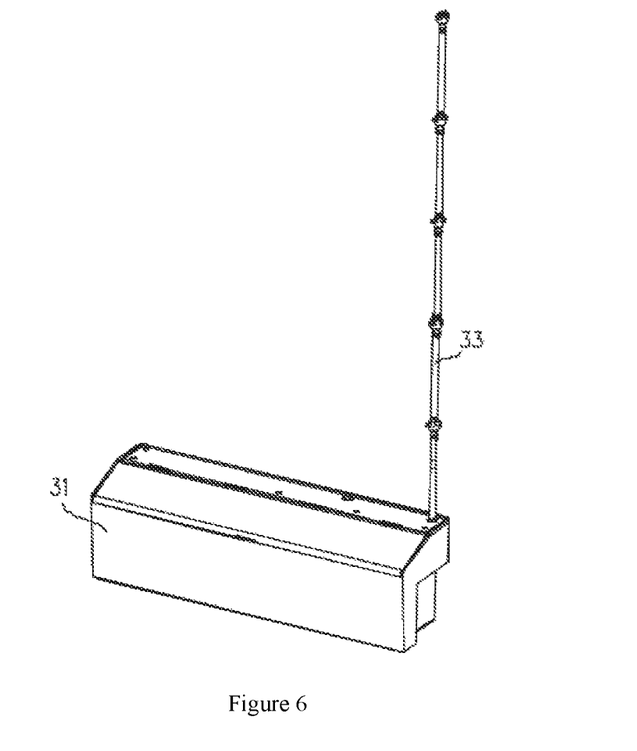
FIG. 6 is a three-dimensional diagram illustrating the cooperation between the water storage tank and the water pipe.

As shown in FIGS. 5 and 6, the watering system comprises a water storage tank 31, a water pump 32 matched with the water storage tank 31, and a water pipe 33 with one end connected to the water outlet of the water pump 32, wherein the water pump 32 is connected to the power supply through a control switch 321 (not shown). Namely, the water inlet of the water pump 32 is connected to the water storage tank 31. The control switch 321 is preferred to be a switch capable of controlling time. Thus, after the control switch 321 is closed, the water pump 32 works, and the water outlet of the water pipe 33 starts to discharge water. Certainly, the water storage tank 31 can be provided with a water level control system for controlling the water level and a germicidal lamp for sterilizing the water.

Specifically, a hook body 211 matched with the hanging hook 13 is disposed on the planting basket 21. Namely, the planting basket 21 can be hung on the stand column 12 through the cooperation between the hanging hook 13 and the hook body 211. When a plurality of planting baskets 21 is hung at the same time, a three-dimensional planting structure resembling a wall body can be formed in a vertical direction.

Furthermore, the water outlet of the water pipe 33 is matched with the flowerpot 22. Namely, the water flows into the flowerpot 22 from the water pipe 33. For instance, the water pipe 33 is provided with a plurality of water outlets, and every two water outlets are correspondingly located above the flowerpot 22.

Thus, the multifunctional hanging-type plant-growing assembly can be flexibly and conveniently used for growing plants, and can be easily maintained by users.

In another preferred embodiment, a flowing water groove 212 is disposed at the upper portion of the planting basket 21. The flowing water groove 212 is horizontally placed. A flowing water maze 213 is disposed on the flowing water groove 212. A water-guiding groove 214 matched with the flowerpot 22 is provided on the side surface of the flowing water groove 212. Namely, every two water outlets of the water-guiding groove 214 are correspondingly located above the flowerpot 22, thereby enabling the flowing water to flow into every flowerpot 22. The water-guiding groove 214 can be engaged with the upper portion of the planting basket 21. Meanwhile, the water outlet of the water pipe 33 is matched with the flowing water maze 213. Namely, the water outlet of the water pipe 33 is connected to the flowing water maze 213, which allows the water to flow within the flowing water maze 213.

The water-guiding groove 214 is provided with a sponge block 215. For instance, the sponge block 215 is clamped in the water inlet of the water-guiding groove 214 or the middle of the water-guiding groove 214. Thus, a good filtering effect can be achieved, and the flow rate of water flow can be reduced. Finally, the amount of the water flowing into each flowerpot 22 can be basically kept the same. A magnet can be bonded to the bottom of the sponge block 215, and the water-guiding groove 214 can be made from a pro-magnet material such as iron. Thus, the sponge block 215 can be detachably fixed at a corresponding position of the water-guiding groove 214.

Additionally, a water leakage hole 216 is provided at the edge of the flowing water groove. Namely, the excessive water in the flowing water groove 212 can flow downwards from the water leakage hole 216, and then flow into the flowing water groove 212 of the lower planting basket 21.

Figure 10:
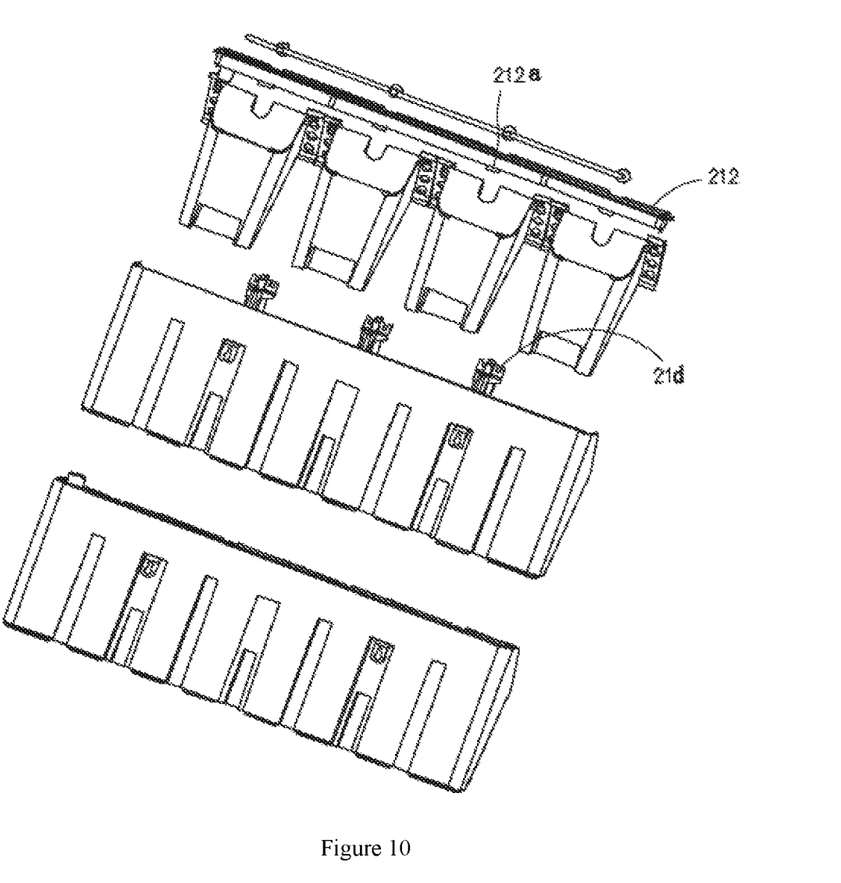
FIG. 10 is an exploded view illustrating the cooperation between the flowing water groove and the planting basket.

As shown in FIG. 10, inserting blocks 212*a* are disposed at the bottom of the flowing water groove 212, and the upper portion of the planting basket 21 is provided with inserting grooves 21*d* that correspond to the inserting blocks 212*a*. Namely, the flowing water groove 212 is fixed above the planting basket 21 in an inserting manner, which can greatly simplify the assembling process.

Figure 7:
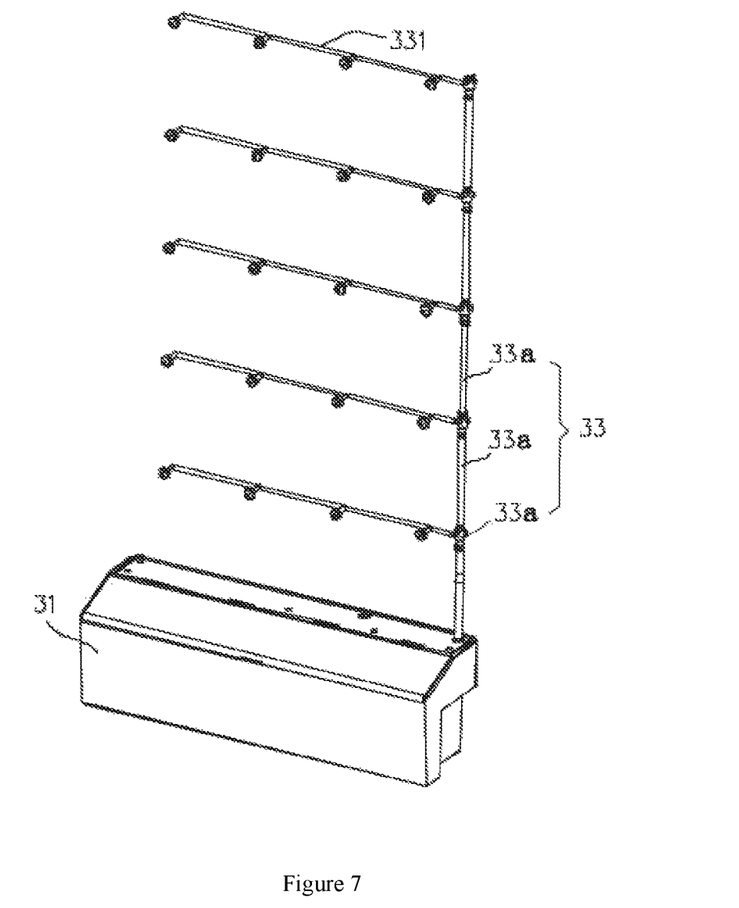
FIG. 7 is a three-dimensional diagram illustrating the cooperation among the water storage tank, the water pipe and the joint pipeline.

In some other embodiments, as shown in FIG. 7, the water pipe 33 is connected to a joint pipeline 331, which is capable of watering the flowerpot 22 in another way.

Figure 11:
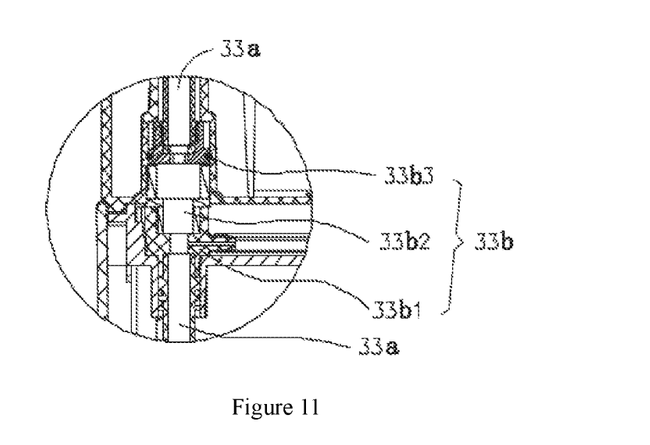
FIG. 11 is an enlarged sectional view of the connecting mechanism of the present invention.

As shown in FIG. 11, the water pipe 33 comprises a plurality of single-section pipelines 33*a*, and the adjacent single-section pipelines 33*a* are connected through a connecting mechanism 33*b*. In this embodiment, the connecting mechanism 33*b* comprises a three-way pipe 33*b*1, a connecting head 33*b*2 and a rubber water-stopping ring 33*b*3. The end portion of the joint pipeline 331 is connected to the single-section pipeline 33*a* through the three-way pipe 33*b*1. The connecting head 33*b*2 is inserted into the top end of the three-way pipe 33*b*1 in a vertical direction, and the rubber water-stopping ring 33*b*3 is sleeved on one side of the connecting head 33*b*2. Namely, the height of the water pipe 33 can be flexibly adjusted according to the requirements, and the rubber water-stopping ring 33*b*3 can achieve a good water-stopping effect.

The hook body 211 is disposed on the rear side surface of the planting basket 21, and the hanging hook 13 is a U-shaped structure having an inward opening. Such a configuration is convenient for hanging the planting baskets 21. Meanwhile, two planting baskets 21 can be hung back to back on a same group of hanging hooks 13. Thus, the number of the planting baskets 21 can be increased.

Furthermore, the bottom frame 11 comprises a rectangular front frame body 111. A drawing frame 112 is disposed at the rear portion of the front frame body 111. The drawing frame 112 adopts a drawer-type structure for connecting the front frame body 111. After the drawing frame 112 is drawn out, the floor-touching area of the bottom frame can be increased. Meanwhile, the lower end of the stand column 12 is fixed to the rear portion of the front frame body 111. In such a way, when planting baskets 21 are hung back to back on both sides of the plant-growing assembly of the present invention, the drawing frame 112 is preferably drawn out, thereby preventing the multifunctional hanging-type plant-growing assembly from toppling. When the planting baskets 21 are hung on one side of the assembly, the drawing frame 112 can be pushed into the front frame body 111, which allows the present invention to be conveniently placed against the wall.

Figure 4:
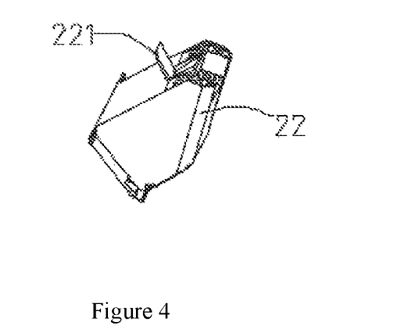
FIG. 4 is a three-dimensional diagram of the flowerpot of the present invention.

As shown in FIG. 4, the flowerpot 22 is a quadrate-tapered structure, and the lower end of the flowerpot is smaller than the upper end of the flowerpot. Such a structure allows the flowerpot 22 to be easily accessed by users.

A supporting leg 221 is hinged to the lower portion of the rear side surface of the flowerpot 22. A limiting device is necessarily provided between the supporting leg 221 and the flowerpot 22 so that a stable included angle can be formed between the supporting leg 221 and the rear side surface of the flowerpot 22. In this way, the flowerpot 22 can be conveniently placed on the ground.

In another preferred embodiment, a sliding plate 21*a*, which can be inserted in the flowerpot 22, is disposed in the planting basket 21. A partition plate 21*b* is disposed between every two adjacent flowerpots 22. A vertical slide way 21*c*, which allows the partition plate 21*b* to be inserted, is provided in the planting basket 21. Namely, the flowerpots 22 are inserted into the corresponding planting baskets 21 from top to bottom, which can be stably installed and easily taken out. Meanwhile, the partition plates 21*b* can be conveniently inserted in and taken out.

Furthermore, a lamp box 40, which is fixed at the upper end of the stand column 12, is connected to the power supply through an illumination control knob 41. The lamp box 40 is preferably includes an upper cover. The illumination control knob 41 possesses a time-controlling function, which can appropriately control the illuminating time to ensure the growth of the indoor plants. Meanwhile, the lamp box 40 can be provided with various light sources to meet the illuminating requirements of different plants and the plants in different growth stages.

A plurality of universal wheels is disposed at the bottom of the bottom frame 11 for allowing the present invention to be conveniently moved.

The bottom of the flowerpot 22 is provided with a magnet. Correspondingly, the bottom of the planting basket 21 is provided with an iron block or a magnet so that the flowerpot 22 can be prevented from falling off after being placed into the planting basket 21.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A multifunctional hanging-type plant-growing assembly, comprising: a supporting system, a planting system, and a watering system, wherein the supporting system comprises a bottom frame, at least two stand columns that are fixed on the bottom frame and extend upwards, and hanging hooks disposed on the stand columns, wherein the planting system comprises at least one planting basket and at least one flowerpot placed in the planting basket wherein the watering system comprises a water storage tank, a water pump connected to the water storage tank, and a water pipe with one end connected to a water outlet of the water pump, wherein the water pump is connected to a power supply through a control switch, wherein a hook body matched with the hanging hook is disposed on the planting basket, wherein the water outlet of the water pipe is matched with the at least one flowerpot, wherein a flowing water groove is disposed at an upper portion of the planting basket and a flowing water maze is disposed on the flowing water groove, wherein a water-guiding groove matched with the flowerpot is provided on a side surface of the flowing water groove, wherein the water outlet of the water pipe is matched with the flowing water maze, wherein the water-guiding groove is provided with a sponge block, and a water leakage hole is provided at an edge of the flowing water groove.

2. The multifunctional hanging-type plant-growing assembly of claim 1, wherein inserting blocks are disposed at a bottom of the flowing water groove, and the upper portion of the planting basket is provided with inserting grooves that correspond to the inserting blocks.

3. The multifunctional hanging-type plant-growing assembly of claim 1, wherein the water pipe is connected to a joint pipeline.

4. The multifunctional hanging-type plant-growing assembly of claim 3, the water pipe comprises a plurality of single-section pipelines, and adjacent single-section pipelines of the plurality of single-section pipelines are connected through a connecting mechanism.

5. The multifunctional hanging-type plant-growing assembly of claim 4, wherein the connecting mechanism comprises a three-way pipe, a connecting head and a rubber water-stopping ring, wherein an end portion of the joint pipeline is connected to the single-section pipeline through the three-way pipe, wherein the connecting head is inserted into a top end of the three-way pipe in a vertical direction, and the rubber water-stopping ring is sleeved on one side of the connecting head.

6. The multifunctional hanging-type plant-growing assembly of claim 1, wherein the hook body is disposed on a rear side surface of the planting basket, and the hanging hook is a U-shaped structure having an inward opening.

7. The multifunctional hanging-type plant-growing assembly of claim 6, wherein the bottom frame comprises a front frame body, wherein a drawing frame is disposed at a rear portion of the front frame body, wherein a lower end of a stand column of the at least two stand columns is fixed to the rear portion of the front frame body.

8. The multifunctional hanging-type plant-growing assembly of claim 1, wherein the flowerpot is a quadrate-tapered structure, and a lower end of the flowerpot is smaller than an upper end of the flowerpot, wherein a supporting leg is hinged to a lower portion of a rear side surface of the flowerpot.

9. The multifunctional hanging-type plant-growing assembly of claim 8, wherein a sliding plate, which can be inserted in the flowerpot, is disposed in the planting basket, wherein a partition plate is disposed adjacent to the at least one flowerpot, wherein a vertical slide way, which allows the partition plate to be inserted, is provided in the planting basket.

10. The multifunctional hanging-type plant-growing assembly of claim 1, wherein a lamp box, which is fixed, at an upper end of a stand column of the at least two stand columns is connected to the power supply through an illumination control knob.

11. The multifunctional hanging-type plant-growing assembly of claim 1, wherein a plurality of universal wheels is disposed at a bottom of the bottom frame.

* * * * *